United States Patent
Salter

(10) Patent No.: US 8,464,216 B2
(45) Date of Patent: *Jun. 11, 2013

(54) PROVIDING ASSISTANCE FOR EDITING MARKUP DOCUMENT BASED ON INFERRED GRAMMAR

(75) Inventor: Craig Salter, Hamilton (CA)

(73) Assignee: International Business Machines Corporation, Armonk, NY (US)

( * ) Notice: Subject to any disclaimer, the term of this patent is extended or adjusted under 35 U.S.C. 154(b) by 1310 days.

This patent is subject to a terminal disclaimer.

(21) Appl. No.: 12/206,788

(22) Filed: Sep. 9, 2008

(65) Prior Publication Data

US 2009/0006957 A1    Jan. 1, 2009

Related U.S. Application Data

(63) Continuation of application No. 10/782,499, filed on Feb. 19, 2004, now Pat. No. 7,437,709.

(51) Int. Cl.
*G06F 9/45* (2006.01)

(52) U.S. Cl.
USPC ............................................. 717/112

(58) Field of Classification Search
USPC ............................................. 717/112
See application file for complete search history.

(56) References Cited

U.S. PATENT DOCUMENTS

| | | | |
|---|---|---|---|
| 5,655,130 A | 8/1997 | Dodge et al. | |
| 6,163,785 A | 12/2000 | Carbonell et al. | |
| 6,411,952 B1 | 6/2002 | Bharat et al. | |
| 6,986,101 B2 | 1/2006 | Cooper et al. | |
| 7,437,709 B2 * | 10/2008 | Salter | 717/112 |
| 2002/0103835 A1 | 8/2002 | Kearney | |
| 2002/0143529 A1 | 10/2002 | Schmid et al. | |
| 2002/0147747 A1 | 10/2002 | Zaharkin | |
| 2003/0028364 A1 * | 2/2003 | Chan et al. | 704/1 |
| 2003/0121008 A1 | 6/2003 | Tischer | |
| 2003/0167442 A1 | 9/2003 | Hagerty et al. | |
| 2003/0229608 A1 | 12/2003 | Reynar et al. | |
| 2005/0099398 A1 | 5/2005 | Garside et al. | |

OTHER PUBLICATIONS

Lammel et al., "Semi-automatic Grammar Recovery", Software—Practice and Experience, John Wiley & Sons, Aug. 7, 2001, pp. 1-44.
Jeong et al., "Induction of Integrated View for XML Data with Heterogeneous DTDs", ACM, CIKM '01, Nov. 5-10, 2001, pp. 151-158.

* cited by examiner

*Primary Examiner* — John Chavis
(74) *Attorney, Agent, or Firm* — Stephen J. Walder, Jr.; David A. Mims, Jr.

(57) ABSTRACT

Methods and apparatus are provided for assisting a user who is editing a markup document on a computer. The user is presented with the markup document on a display of the computer for editing and provided with grammatical assistance based on a grammar inferred from current content of the markup document. The grammar may be inferred and updated automatically after the markup document is loaded or edited. The assistance provided may be based on a combination of an inferred grammar and a real grammar. The markup document can be an extensible markup language (XML) document.

20 Claims, 8 Drawing Sheets

PROVIDING ASSISTANCE FOR EDITING MARKUP DOCUMENT BASED ON INFERRED GRAMMAR

This application is a continuation of application Ser. No. 10/782,499, filed Feb. 19, 2004, status awaiting publication.

This invention relates to document editing, particularly to computer assisted editing of markup documents.

Markup documents are widely used in electronic communication. A markup document is an electronic document containing text strings formatted according to a grammar of a markup language such as the Extensible Markup Language (XML). For example, an XML document is a markup document conforming to an XML grammar. The grammar of an XML document may be defined in an XML schema definition (XSD), commonly referred to as an XML schema. A grammar of a markup language can also be described using a Data Type Definition (DTD) document. The grammar associated with an XML document can be stored in the XML document or in a separate grammar document specified in the XML document, such as in a DOCTYPE declaration. The associated grammar may also be otherwise stored and specified. Different sections in an XML document may be associated with different grammars and the XML document may specify multiple associated grammar files. While many XML documents specify the associated grammar(s), some XML documents do not.

Many specialized editors for editing markup documents have been developed to facilitate the creation and editing of markup documents. Example existing markup document editors include XMLSpy™, XMLwriter™ for Windows, ElfData™, oXygen™, and XMLmind™, which can be used to edit XML and other types of markup documents. One of the common features of many existing markup document editors is to provide guided editing or editing assistance, such as automatic word-completion and context-sensitive prompting and suggestion of permissible words. These existing editors rely on one or more grammar documents, such as DTD or XML schema documents, for all or some of the editing assistance functions.

All of the existing markup document editors suffer a drawback: the editing assistance features will not function properly if the editor has no access to the proper grammar associated with the section of the markup document to be edited. If a grammar document is not available at all, all or some of the assistance functions will be disabled. A grammar document may be unavailable because it is not specified in the markup document or because the specified grammar file is nonexistent or inaccessible. Even if a grammar document is available, it can be incomplete or inaccurate, resulting in incomplete or erroneous assistance being provided by the editor. A grammar document can become incomplete or inaccurate under various circumstances. For example, changes in the XML document may require a change in the associated grammar which has not been incorporated into the grammar document. To obtain proper assistance, a user may have to first create or obtain a complete and accurate grammar document and associate it with the markup document before he or she starts an editing session with an existing markup document editor. Some users may not be familiar with a particular markup language or its related tools and may not even know why assistance is not available. Some users may not know how to create a proper grammar document. Even for those who know how, maintaining an updated grammar document is still cumbersome. Thus, these editing assistance features of the existing markup document editors are not convenient to use, particularly when the document is associated with non-standard grammars.

Therefore, there is a need to provide improved, conveniently available editing assistance to a user editing a markup document.

SUMMARY OF THE INVENTION

In accordance with the invention, grammatical assistance is provided to a user editing a markup document based on a grammar which is inferred from the current content of the document being edited. The inferred grammar can be automatically updated after the user has made a change to the document. Thus, the grammatical assistance is conveniently available even when a real grammar is not specified or is otherwise unavailable.

According to an aspect of the invention, there is provided a method of assisting a user who is editing a markup document on a computer, comprising: presenting to the user the markup document on a display of the computer for editing; and providing grammatical assistance to the user based on a grammar inferred from current content of the markup document.

According to another aspect of the invention, there is provided a method of providing assistance to a user who is editing an extensible markup language (XML) document, comprising: presenting to the user the XML document for editing; monitoring a user input for an edit event; after detecting an edit event, inferring a grammar from the current content of the XML document; providing assistance to the user based on the inferred grammar.

According to another aspect of the invention, there is provided a computer which is adapted to carry out any one of the methods described in the above two paragraphs.

According to another aspect of the invention, there is provided a computer readable medium storing thereon computer executable instruction code, the code when executed by a processor of a computer causes the computer to: present a markup document on a display of the computer to a user for editing; and provide grammatical assistance to the user based on a grammar inferred from current content of the markup document.

According to another aspect of the invention, there is provided a computer which is adapted to access the computer readable medium described above and to execute the computer executable code stored thereon.

Other aspects, features and advantages of the invention will become apparent to those of ordinary skill in the art upon review of the following description of specific embodiments of the invention in conjunction with the accompanying figures.

BRIEF DESCRIPTION OF THE DRAWINGS

In the figures, which illustrate exemplary embodiments of the invention.

DETAILED DESCRIPTION

In overview, grammatical assistance is provided to a user editing a markup document on a computer based on a grammar inferred from the current content of the document. As a result, assistance can be provided even when a real grammar is not available. Further, the assistance provided is consistent with the current content of the document.

A markup document is an electronic file containing one or more text strings formatted according to one or more grammars of a markup language, such as the Extensible Markup language (XML). For more information on XML, see "Extensible Markup Language (XML) 1.0 (Second Edition)", available online at <http://www.w3.org/TR/REC-xml>. A markup document can also contain non-textual contents such as graphical contents. The graphical contents may also be formatted according to a grammar of a markup language.

A grammar refers to a body of forms and usages in a specific language. A grammar may include the vocabulary and the syntax rules of the language. A markup language grammar, such as an XML grammar, includes a plurality of rules. For example, the rules of an XML grammar include definition rules, which create new types of elements and attributes, and declaration rules which enable elements and attributes with specific names and types to appear in markup document conforming to the grammar. A rule for an element can specify the syntax associated with the element, including permissible child elements, permissible order of the child elements, and permissible attributes. A definition rule typically contains a set of element declarations, element references, and attribute declarations. A declaration is an association between a name and the constraints, which govern the appearance of that name in documents governed by the associated schema.

Many standard markup grammars exist. For example, a popular standard XML grammar is recommended by the World Wide Web Consortium (W3C) and is defined in what is known as the W3C XML schema definition (XSD).

Figure 1:
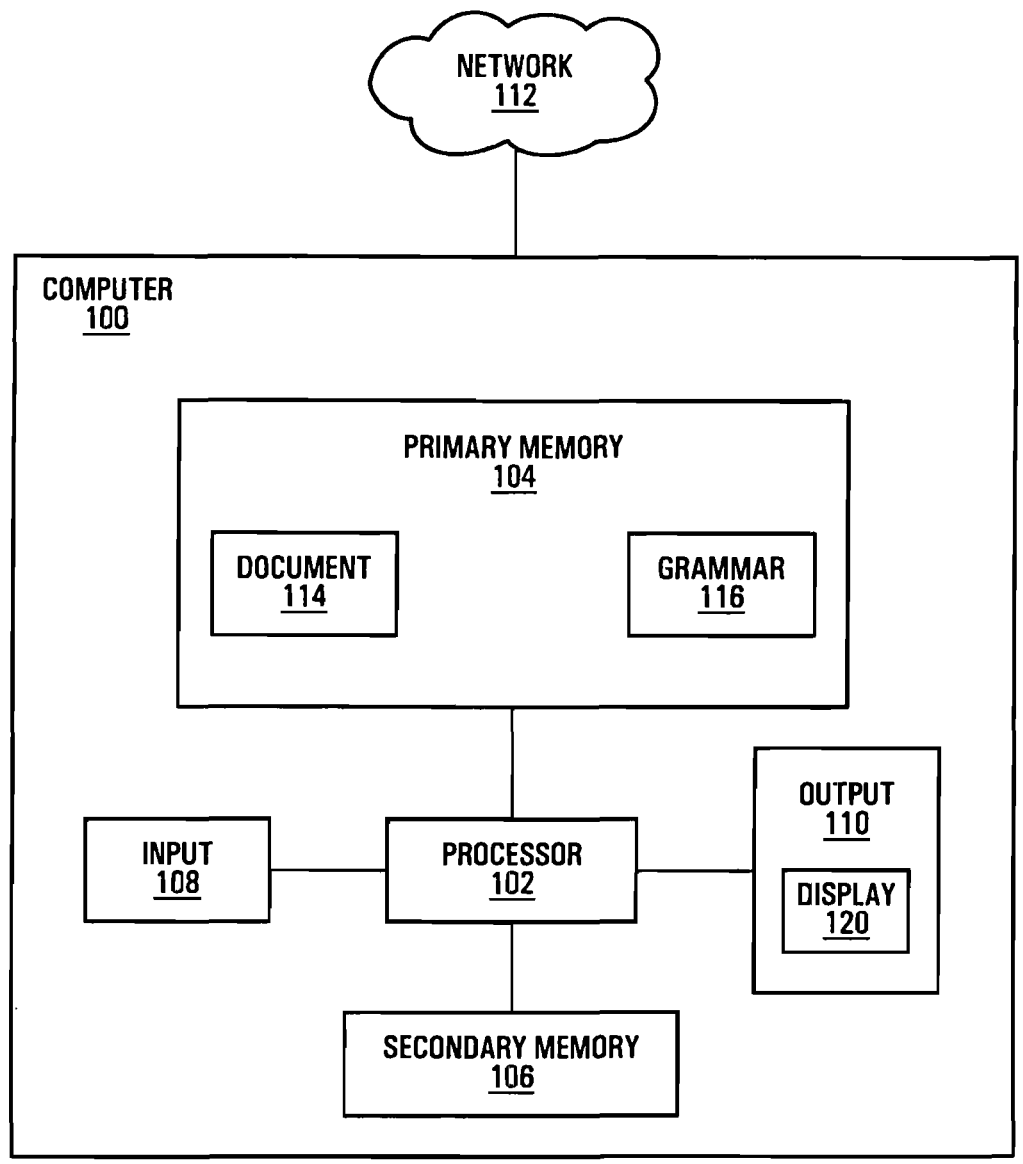
FIG. 1 is a schematic diagram illustrating a computer system for editing a markup document.

FIG. 1 illustrates a computer 100 embodying aspects of the invention and on which a user can edit a markup document such as an XML document. For simplicity and ease of understanding, the following description will make reference to XML documents, but it is understood that the computer can be used to edit other types of markup documents and the following description can be readily applied to these other markup documents with suitable modifications.

As is typical, computer 100 has a processor 102, which communicates with primary memory 104, secondary memory 106, input 108 and output 110. Computer 100 may optionally communicate with a network 112.

Processor 102 includes one or more processors for processing computer executable codes and data.

Each of memories 104 and 106 is an electronic storage comprising a computer readable medium for storing electronic data including computer executable codes. Primary memory 104 is readily accessible by processor 102 at runtime and typically includes a random access memory (RAM). Primary memory 104 only needs to store data at runtime. Secondary memory 106 can store data permanently, typically in the form of electronic files. Secondary memory 106 can also be used for other purposes known to persons skilled in the art. A computer readable medium can be any available media accessible by a computer, either removable or non-removable, either volatile or non-volatile, including any magnetic storage, optical storage, or solid state storage devices, or any other medium which can embody the desired data including computer executable instructions and can be accessed, either locally or remotely, by a computer or computing device. Any combination of the above is also included in the scope of computer readable medium.

Input device 108 typically includes a keyboard and a mouse. It can also include a microphone, a scanner, a camera, and the like. It may also include a computer readable medium and the corresponding device for accessing the medium. Input 108 can be used to receive input from the user, such as editing instructions. An input device can be locally or remotely connected to processor 102, either physically or in terms of communication connection.

Output device 110 includes a display device 120, such as a monitor. Output 110 may also include other devices such as a printer, a speaker, and the like, as well as a computer writable medium and the device for writing to the medium. Like input device 108, an output device 110 can be local or remote.

Computer 100 may communicate with other computer systems (not shown) on network 112. Network 112 may be embodied using conventional network technologies and may include one or more of the following: local area networks, wide area networks, intranets, the Internet, wireless networks, and the like. For clarity and conciseness, aspects of the present invention are illustrated using only computer 100 throughout the description herein. However, as will be appreciated by those of ordinary skill in the art, aspects of the invention may be distributed amongst one or more networked computing devices, which communicate and interact with computer system 100, via one or more data networks such as network 112.

It will be understood by those of ordinary skill in the art that computer system 100 may also include other, either necessary or optional, components not shown in the figure. By way of example, such other components may include other elements of a central processing unit (CPU); hardware such a circuit board incorporating a programmed application; network devices and connections, such as modems, telephone lines, network cables, and wireless connections; additional processors; additional memories; additional input and output devices; and the like. Further, two or more components of the computer system 100 may be embodied in one physical device. For example, a processor chip may also have built-in memory; and memory storage, such as a disk, can form part of each of primary memory 104, secondary memory 106, input device 108, and output device 110.

The markup Document 114 to be edited and an inferred Grammar 116, which is inferred from the current content of Document 114 as will be further described below, are loaded into and resident on primary memory 104. Document 114 may be initially loaded into memory 104 from an existing file stored on secondary memory 106, or can be entirely entered by a user during an editing session from input 108. The content of Document 114 can be entered or altered, .i.e. edited, during an editing session by a user through input 108. A user may enter input through an interactive user input device, such as a keyboard and/or a mouse, or through other input devices such as a writing pad, microphone or a computer readable medium storing an input file, as can be understood by a person skilled in the art.

Figure 2:
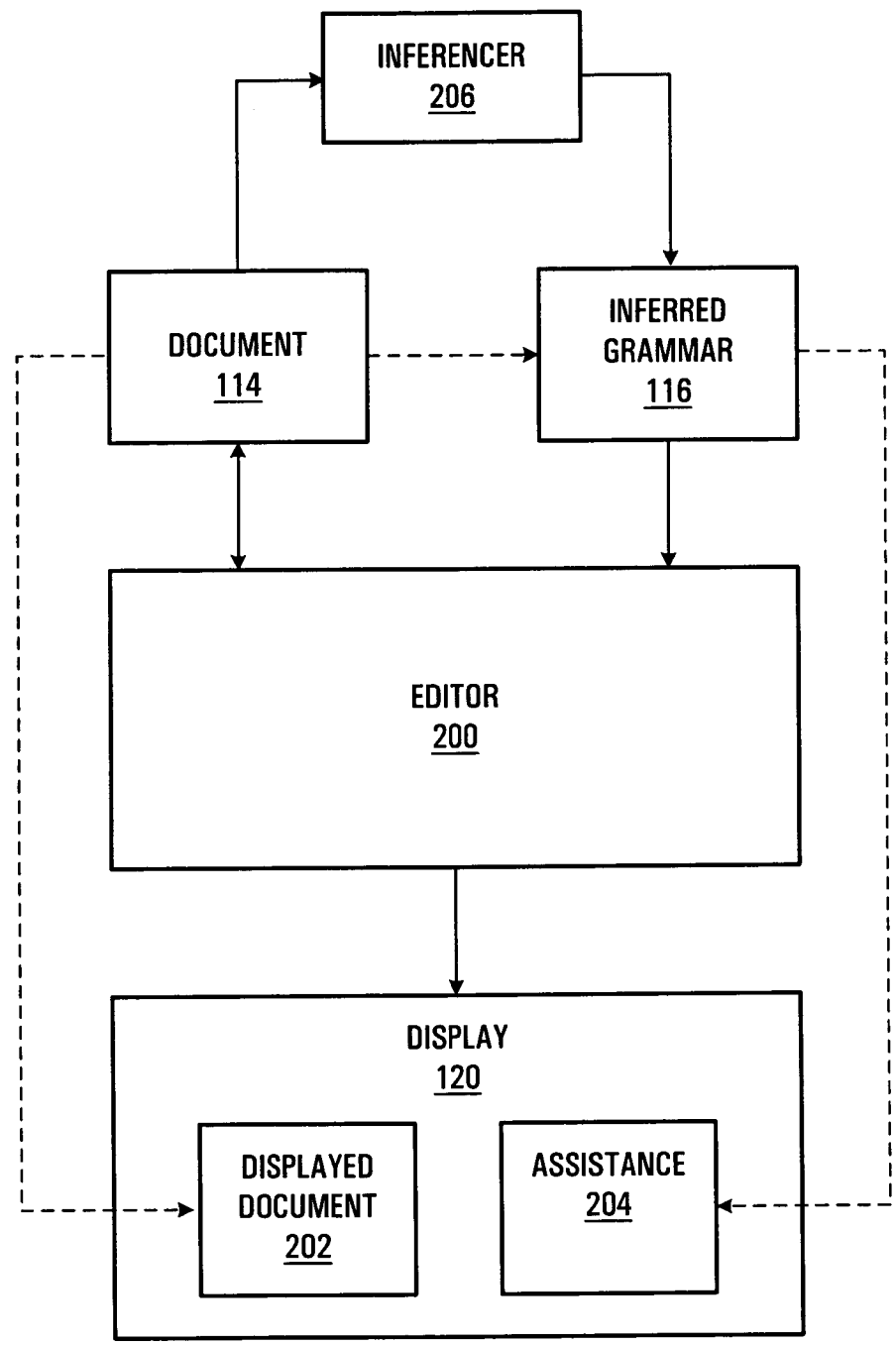
FIG. 2 is a block diagram schematically illustrating the relationships between the components of the computer system of FIG. 1.

Computer 100 may also include an Editor 200 for editing Document 114 and providing grammatical assistance to the user based on inferred Grammar 116, as illustrated in FIG. 2.

Referring to FIG. 2, the current content of Document 114 is presented by Editor 200 to the user on Display 120, referred to as the Displayed Document 202 (see FIGS. 3 to 6 for example screen shots illustrating displayed documents). Editing Assistance 204 is also provided to the user by Editor 200 on Display 120 (also see FIGS. 3 to 6). Although shown separately in FIG. 2, it is understood that Displayed Document 202 and Assistance 204 can be displayed integrally, such as within the same editing window.

Editing assistance, including grammatical assistance, can be provided in various forms and manners, which are known to persons skilled in the art. Grammatical assistance can include any assistance that is provided based on a grammar. Assistance 204 can include context-sensitive help information and editing guidance presented to the user on Display 120. Assistance 204 can also include automatically executing one or more editing functions, automatically entering data contents into Document 114, or listing or automatically invoking a related tool or application for performing a function or task. Automatic completion is a typical form of assistance, in which a partially typed text string is automatically completed. The completed string may be highlighted and the user may be provided with an option to accept or reject the completed string. A typical form of guidance is to display a list of permissible text strings from which the user can select one as the input. The list of permissible strings can be displayed automatically or at the user's request. It can be displayed in pop-up or pull-down menus, or in pop-up windows. As can be appreciated, context-sensitive assistance can be provided depending on a cursor position and the text surrounding the cursor. These and other forms of editing assistance are known to persons skilled in the art and can be readily implemented in Editor 200 by persons skilled in the art. Example forms of editing assistance can be found in US Patent Application Publication No. 2003/0229608, entitled "Providing Contextually Sensitive Tools and Help Content in Computer-Generated Document," published on Dec. 11, 2003, J. Reynar et al.

As mentioned and further described below, grammatical Assistance 204 is provided based on inferred Grammar 116.

Editor 200 is a computer application including computer executable algorithms. As illustrated in the figures and described further below, Editor 200 can be implemented as a software application comprising computer executable codes, which is also loaded into memory 104. However, Editor 200 or one or more components of Editor 200 may also be implemented as a hardware application, for example by incorporating the corresponding algorithms in a circuit board connected to computer 100. For ease of description, the exemplary embodiments herein are described with reference to a software implementation of Editor 200. Persons skilled in the art can readily convert a software application described herein into a hardware application.

Implemented as a software application, Editor 200 comprises computer executable instruction codes for editing Document 114 and providing assistance to the user while the user is editing Document 114. Editor 200 can be loaded into memory 104 in manners known to a person skilled in the art. For example, the codes of Editor 200 may be stored in one or more editor code files on secondary memory 106, which are loaded into primary memory 104 at runtime.

A grammar Inferencer 206 can be provided to infer Grammar 116 from the current content of Document 114. Inferencer 206 can be a computer tool or application, which can be integrated into Editor 200 or can be a standalone application. Inferencer 206 can be callable from Editor 200, or can be executed independent of Editor 200. Further, like Editor 200, Inferencer 206 can be implemented as a software application or a hardware application. Only software implementations of Inferencer 206 are described below for illustration purposes.

Grammar 116 can be inferred from Document 114 in various suitable manners. For example, Grammar 116 may be inferred after Document 114 is initially loaded for editing and subsequently updated only after a change has been made to the content of Document 114. As can be appreciated, Document 114 may be edited simultaneously by multiple users on network 112 and thus the content of Document 114 may change due to editing activities of multiple users on network 112. Alternatively, changes to the content of document may be limited to those made by the current user only, in which case, changes to Document 114 may be monitored by monitoring the user input at computer 100.

Grammar 116 may be inferred and updated automatically or in response to a user input, such as typing a key, positioning a cursor, or clicking a button in the editing window on Display 120. Grammar 116 may be dynamically updated based on real-time edits to Document 114. Grammar 116 may be updated after Document 114 has been edited since it was loaded into primary memory 104 or since the last time Grammar 116 was updated. Grammar 116 may be updated periodically at a fixed time interval. Grammar 116 may be inferred or updated after a period of user inactivity, which may indicate that the user requires some assistance. To conserve computing resources and reduce delay, it may be advantageous to update Grammar 116 only after a predefined time interval has elapsed since Document 114 was last edited. For example, when a user is entering a series of quick key strokes, no grammar inference may need to be performed until a two-second period has elapsed since the last key stroke. Then, grammar 116 may be inferred again from the current content of Document 114 and assistance is provided to the user based on the updated Grammar 116.

Grammar 116 may be inferred using existing grammar inferencing tools or techniques, subject to appropriate modifications as can be understood from the description herein. Examples of known grammar inferencing techniques are described in US Patent Application Publication No. 2003/0167442 to C. G. Hagerty et al, entitled "Conversion of Text Data into a Hypertext Markup Language," published on Sep. 4, 2003; US Patent Application Publication No. 2002/0103835, entitled "Methods and Apparatus for Constructing Semantic Models for Document Authoring," published on Aug. 1, 2002, R. D. Kearney; and "Semi-automatic Grammar Recovery," Software—Practice and Experience 2001, vol. 12 pp. 1-6, R. Lammel and C. Verhoef.

Depending on the assistance to be provided, Grammar 116 may be inferred loosely. In contrast, many existing grammar inferring techniques generally infer grammars precisely. For example, for a given grammar element, existing grammar inferencing tools will typically attempt to define the child elements and their permissible orders. However, if it is sufficient to tell the user only what child elements are permissible, Inferencer 206 may infer only the permissible child elements without determining and defining the permissible orders. Inferring grammar loosely can reduce the computing resources required to perform the inferencing.

In an editing session, Grammar 116 is initially inferred based on the entire content of the initially loaded Document 114. In the same editing session, after a section of Document 114 was changed, only those grammar elements or rules of grammar related to the changed section need to be updated. Other elements or rules need not be inferred again. However, the entire content may be processed again during each update, particularly when inferring from the entire content does not consume excessive computing resources. Inferring from the entire content may be advantageous because it is easy to implement.

Grammar 116 can be represented in various formats or data structures. For example, it can be represented as a list or table of statements, such as element declarations. Such a list can be easily stored in a grammar file such as a DTD file or an XML schema file or in a grammar table. Grammar 116 can also be graphically represented. For example, a grammar model, also known as a meta-model, can be expressed as a tree, where each node of the tree represents an element and the relationships between different elements can be easily traced through the branches of the tree. Inferred Grammar 116 may be expressed using a standard grammar definition format. For an XML document, Grammar 116 may be stored in the XML schema definition (XSD) format or the Data Type Definition (DTD) format.

To illustrate, example screen shots of displayed documents and exemplary grammatical assistance provided by an exemplary embodiment of the invention are shown in FIGS. 3 to 6.

Figure 3:
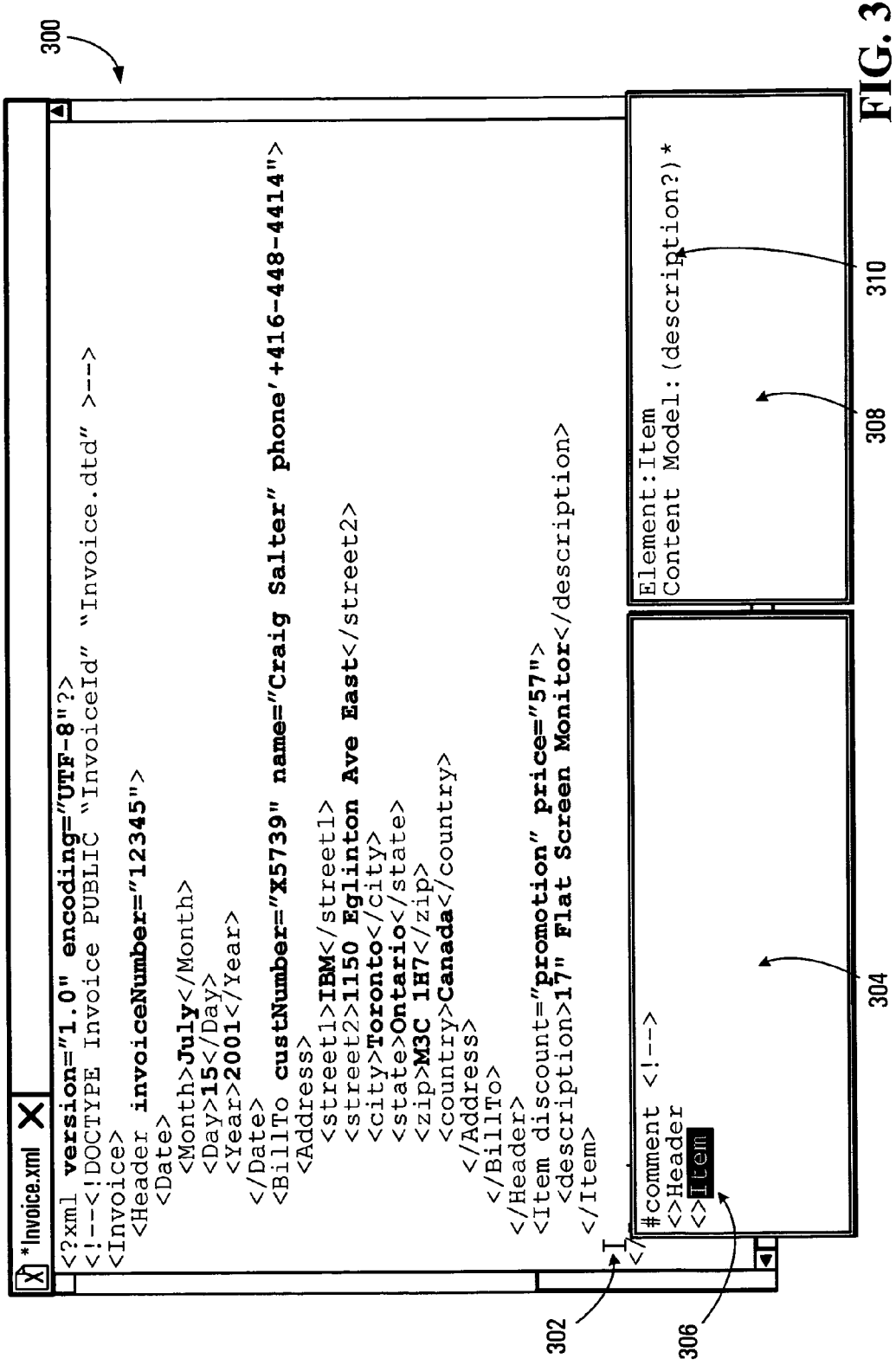
FIGS. 3 to 6 are example screen shots illustrating displayed document and editing assistance.

FIG. 3 shows a screen shot of a displayed XML document 300. As can be seen and appreciated, since the "DOCTYPE" line was commented out, no real grammar was associated with the document. Thus, as will be described, a grammar may be inferred from the entire content of the loaded document and this grammar may be inferred loosely.

As can be understood and inferred from the content of the document displayed, the root grammar element of the document is "Invoice" and it has two possible local child elements, "Header" and "Item." Expressed in a conventional DTD notation, an inferred rule associated with "Invoice" may have the form:

<!Element Invoice(Header?|Item?)*>

As can be appreciated, in this case, the grammar was inferred loosely and the inferred rule does not define the permissible order of the child elements. As a result, the user may enter into the XML document an instance of the "Invoice" element that contains zero or more of any of the two child elements in any order. As can also be inferred, the element "Item" has one child element, "description", which could have a string as its content but has no child element. As well, it is apparent from the second line in window 300 that there is a default global element for comment.

As shown in window 300, the user has placed the editing cursor 302 within an instance of the "Invoice" element and has invoked the assistance function. This has resulted in assistance information based on the inferred grammar associated with the element "Invoice" being displayed in the left assistance window 304, where, in addition to the default "comment" element, two possible local child elements (as indicated with the "< >" tag) were listed: "Header", and "Item". The information displayed in window 304 indicates to the user that these two elements are permissible child elements under the element "Invoice". It is noted that, in this particular implementation, the elements are listed in window 304 in alphabetical order, which does not indicate the permissible order of the elements.

As illustrated, the user can also obtain further assistance on one of the listed child elements in window 304 by selecting the element. As shown in window 304, the user has moved the selection cursor 306 to element "Item". Consequently, grammatical assistance based on the inferred grammar associate with element "item" is provided in the right assistance window 308. As can be appreciated, the information displayed 310 in window 308 tells the user that "Item" has one permissible child element "description" and an instance of "Item" can contain zero or more instances of "description".

Figure 4:
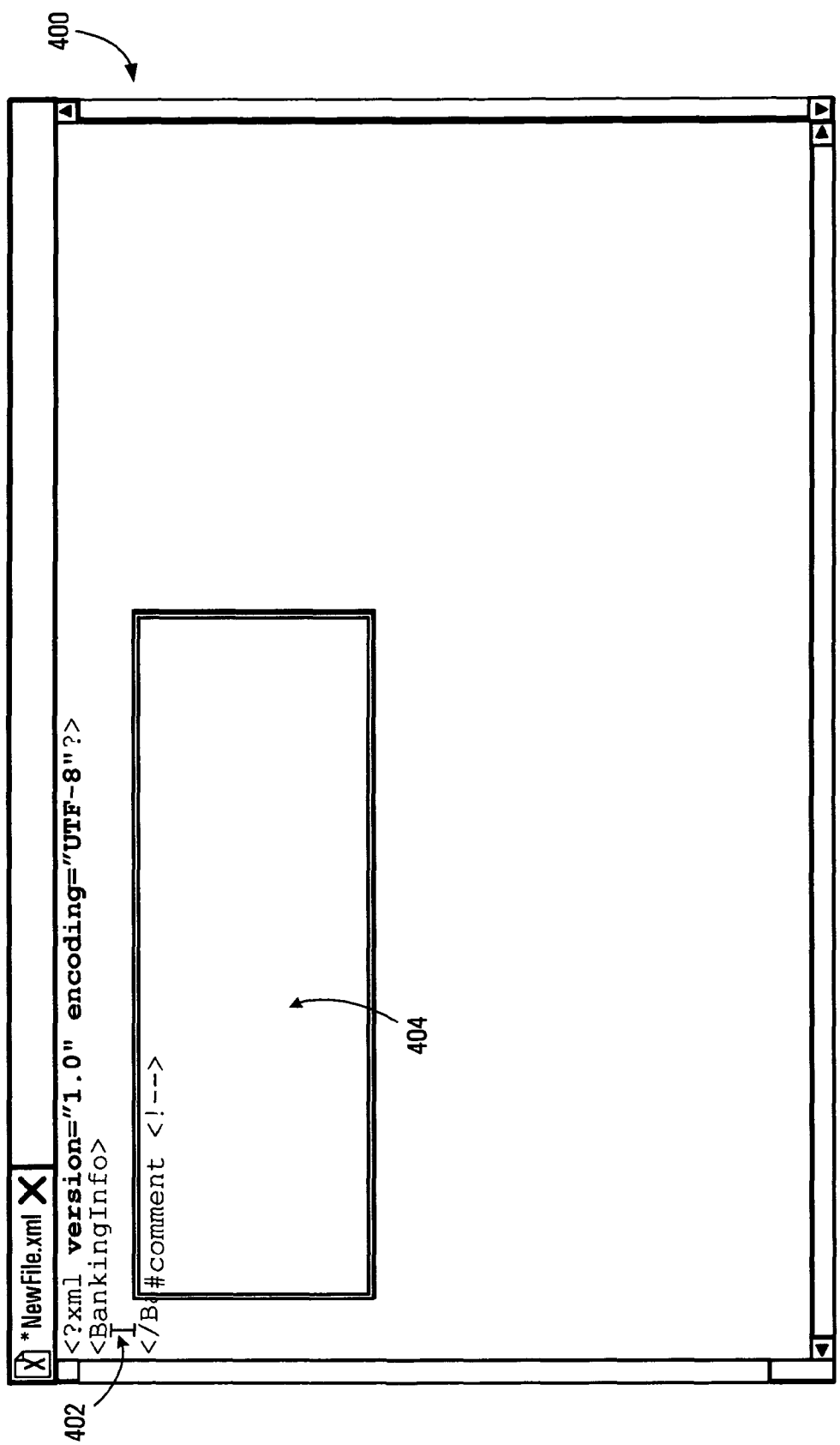
Figure 5:
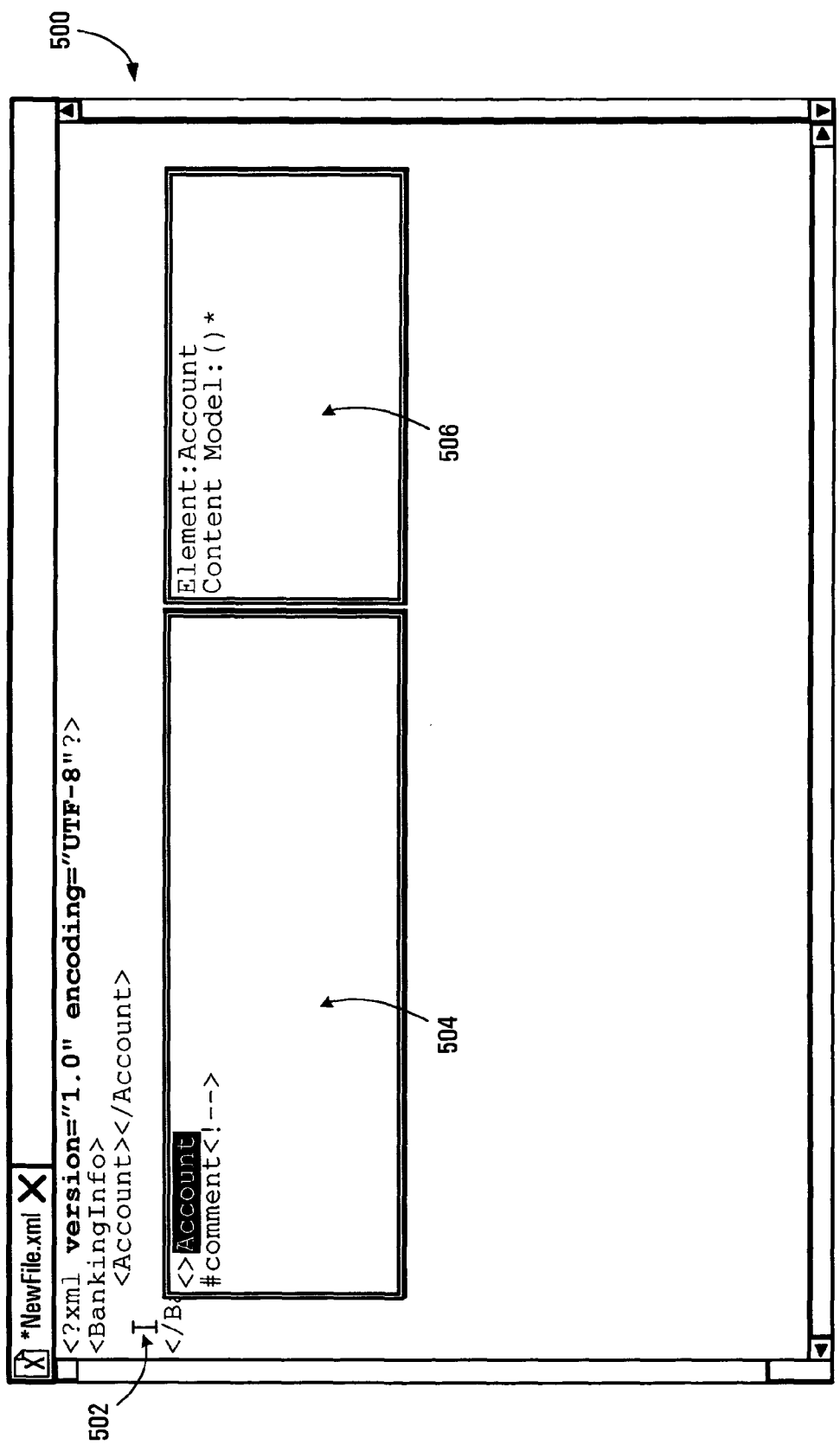
Figure 6:
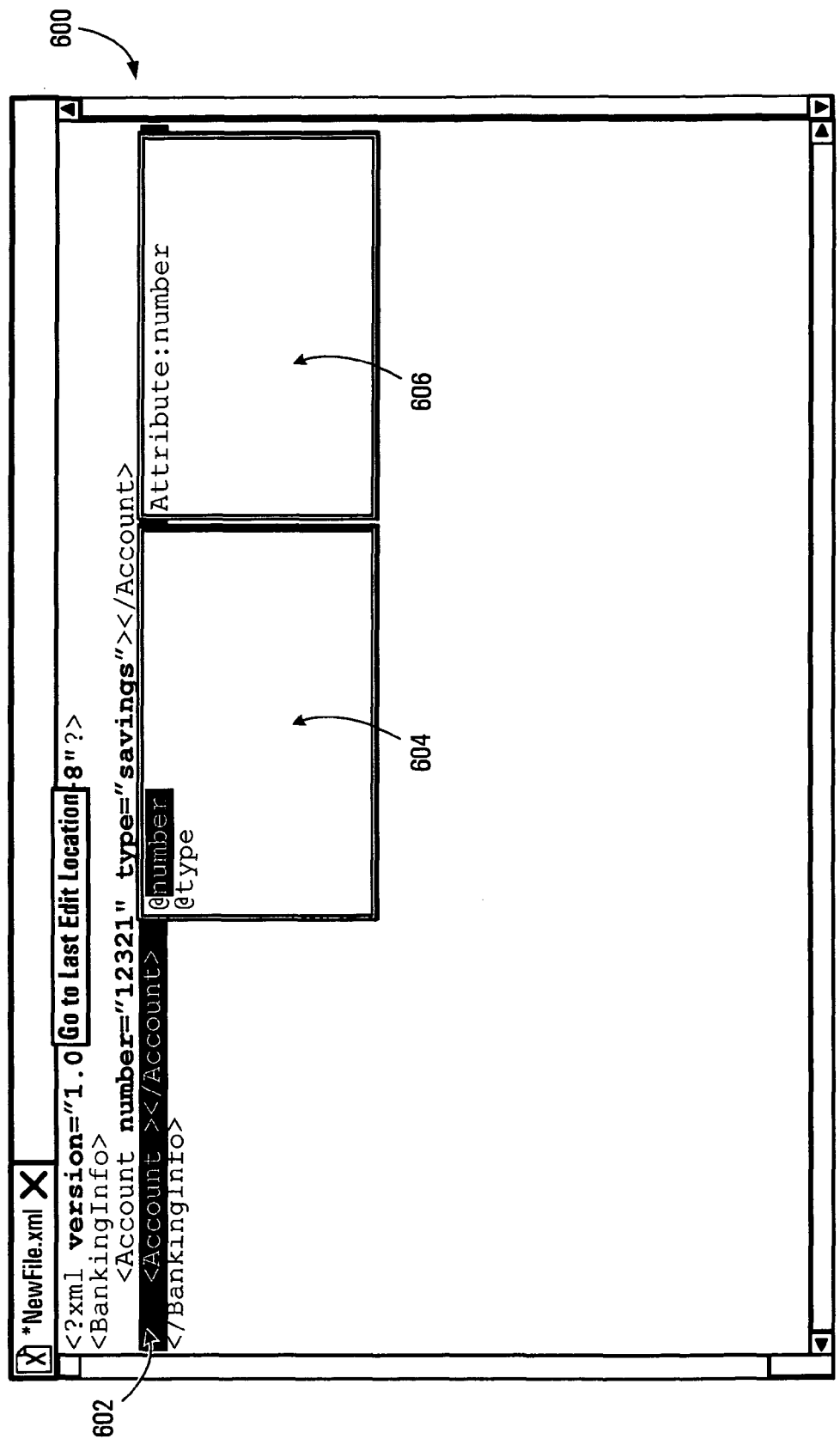

FIGS. 4 to 6 show screen shots recorded in another editing session, illustrating assistance provided based on updated inferred grammars.

In this example, a new XML document is being created in the editing session. FIG. 4 shows the screen shot 400 where when assistance was invoked, only a root element 402 "Bankinginfo" with no content had been added to the document. As such, in the inferred grammar the associated element "Bankinginfo" had only one permissible child element: "comment". The assistance window 404 thus displayed as much.

Referring to FIG. 5, the user then added element "Account" to the document and invoked assistance again. The inferred grammar was updated. Since the updated inferred grammar now included the local child element "Account", an item for "Account" was displayed in the assistance window 504. When the user moved the selection cursor 502 to "Account", the help information for "Account" was displayed in the right assistance window 506, based on inferred grammar associated with the "Account" element.

As shown in FIG. 6, the user then added more content to the document: two attributes of the "Account" element. The inferred grammar was updated again to include the modified rules associated with the "Account" element and the added rules associated with the two newly added attributes: "number" and "type". Upon invoking assistance again when the editing cursor 602 was positioned within another instance of "Account" element in the editing window 600, the left assistance window 604 displays two permissible attributes, as indicated by the "@" sign. If, as shown, the user selects the "number" attribute, the right assistance window 606 displays the help information for attribute "number". On the assumption that the grammar is inferred loosely, the rule associated with attribute "number" may not specify its content type, as may be reflected in information shown in window 606. However, if desirable, grammars may be inferred strictly and precisely to require that the data content of a "number" attribute must be an integer or the like while the "type" attribute can only have a string as its content.

As can be appreciated, it can be advantageous to also provide editing assistance to the user based on one or more real grammars if such grammars are specified and available. A real grammar is one that is pre-stored in a grammar file or other data structure such as a database or a table. In contrast, inferred Grammar 116 is not pre-existing and is inferred at runtime.

In some situations, it may be desirable to provide assistance based on inferred grammar regardless of whether or not a real grammar is available. However, in many cases it can be advantageous to provide assistance based on inferred grammar only when a real grammar is not specified or is otherwise unavailable. When a real grammar associated with an element is available, it may not be necessary or desirable to infer any grammar for that element. In this regard, Editor 200 or Inferencer 206 may include an algorithm to determine if a real grammar is available for a grammar element derived from the content of Document 114.

As can be understood by a person skilled in the art, different sections of a markup document may comply with different grammars and, to avoid confusion, these different grammars are conventionally assigned to different namespaces. The namespace associated with a grammar may be explicitly or implicitly specified in a markup document. Thus, as in conventional editors, Editor 200 may maintain one or more grammar tables mapping multiple grammars to different namespaces. Conveniently, inferred Grammar 116 may be associated with and mapped to a distinct namespace.

As inferred Grammar 116 is mainly used for providing assistance during an editing session, it is not necessary to save a permanent copy of the grammar. However, if desired, a copy of the grammar may be saved for later use, such as for validation of other versions of the edited document or other related documents, or for preparing a grammar file.

Figure 7:
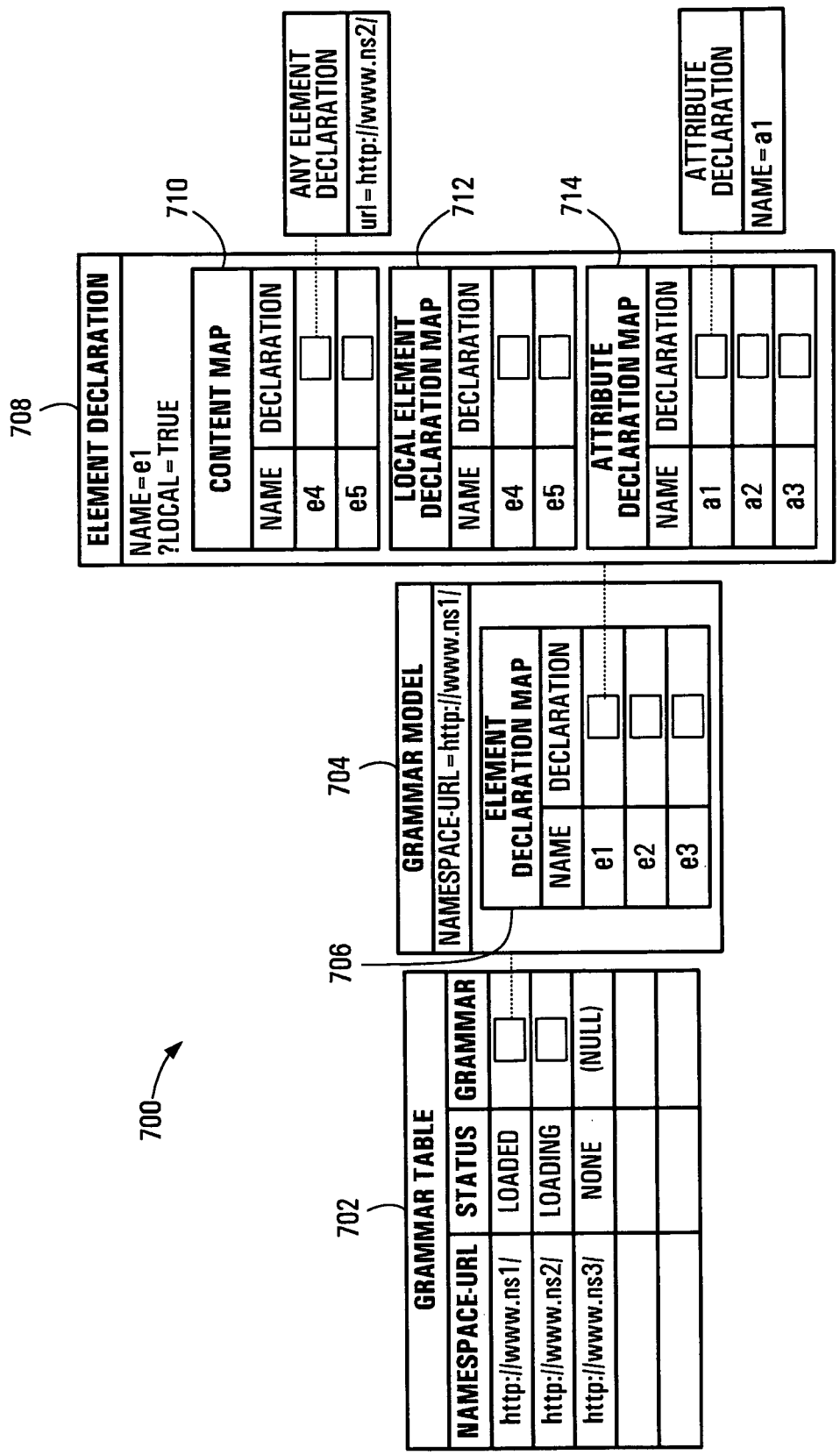
FIG. 7 schematically illustrates a grammar data structure for storing grammars.

An exemplary grammar data structure 700 is illustrated in FIG. 7. As illustrated, grammar data structure 700 includes nested grammar mapping tables.

The top level table, Grammar Table 702, lists each grammar associated with Document 114, including the grammar's associated namespace, its loading status, and its corresponding Grammar Model Table 704.

Each Grammar Model Table 704 has an Element Declaration Map 706 listing the name of each acceptable element at the root level and its corresponding element declaration. The Grammar Model Table 704 also has an entry indicating its associated namespace.

Element Declarations are stored in the Element Declaration Tables 708. Each Element Declaration Table 708 includes three sub-tables: a Content Map 710, a Local Element Declaration Map 712, and an Attribute Declaration Map 714. A Content Map 710 lists the inferred child elements of the given parent and their corresponding declarations. A Local Element Declaration Map 712 lists local child elements for the given parent element. An Attribute Declaration Map 714 lists the name of acceptable attributes and their corresponding declarations.

Further nested tables may be required if any of the child elements has its own child elements. A branch of nesting terminates when an element or attribute has no child element.

It is not necessary to store Grammar 206 in the data structure illustrated in FIG. 7, which is only one of many data structures that can be readily incorporated into an embodiment of the invention by persons skilled in the art. Grammar 206 can be stored in other suitable data structures.

To further illustrate the embodiments described above, an exemplary implementation of Editor 200 and Inferencer 206 is described below.

Figure 8:
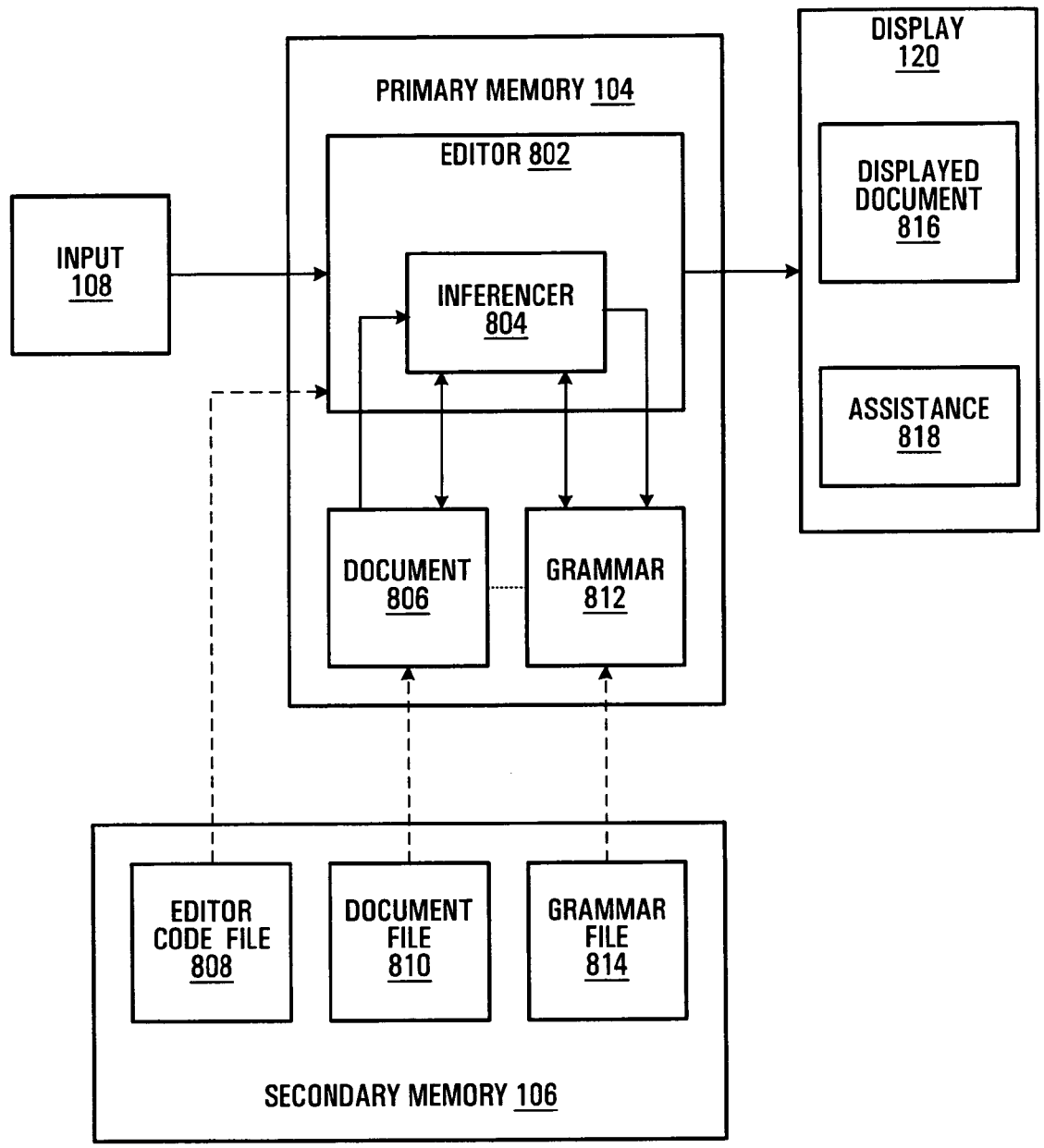
FIG. 8 is a block diagram illustrating a particular embodiment of a markup document editor.

Referring to FIG. 8, in this particular embodiment, an XML Editor 802 is implemented as a software application. The Inferencer 804 is also implemented as a software tool which is integrated with Editor 802. Computer executable codes for Editor 802 may be stored in a code file 808 stored on secondary memory 106. At runtime, Editor 802 is loaded into primary memory 104 to be executed by processor 102. Editor 802 includes a navigating and parsing component (not shown) for navigating and parsing Document 806 and an element handler (not shown) for processing each grammar element encountered during navigation. The navigator and the parser can be constructed in any suitable manner known to persons skilled in the art and can include existing interfacing tools. For example, known XML application program interfaces (API), such as Document Object Model (DOM) or Simple API for XML (SAX), can be used. Many existing XML editors provide an XML API such as DOM which can be conveniently incorporated into Editor 802 for constructing a DOM associated with Document 806, which includes a set of grammar elements associated with portions of the current content of Document 806. The set of elements can be hierarchically structured. For each grammar element in the document object model, the element handler is called to process the element. Element handler has an algorithm for determining if a real grammar is associated with the element and is available, and therefore if a grammar needs to be inferred for this element. If an associated real grammar is available, the real grammar is loaded. If a real grammar is not available, an inferred grammar is inferred from the relevant sections in Document 806. Element handler can be readily implemented by persons skilled in the art.

The XML Document 806 to be edited may be initially loaded into primary memory 104 from a document file 810 stored on secondary memory 106 or may be entered by the user from input 108.

A grammar data structure, referred to herein as Grammar 812, is maintained by Editor 802 and stored in primary memory 104 at runtime. Grammar 812 may contain one or more real grammars, one or more inferred grammars, or both real and inferred grammars, depending on the current content of Document 808 and the availability of any real grammar file specified. Grammar 812 is stored in a data structure similar to the one described above and illustrated in FIG. 7. As can be appreciated, a real grammar can be partially or wholly loaded into memory 104 from an existing grammar file 814 stored on secondary memory 106, if file 814 is specified, such as in the XML Document 806, and is available. Grammar 812 may include grammars loaded from multiple grammar files, such as when grammars for different namespaces are required. Regardless if an existing, pre-created grammar is initially loaded, Grammar 812 can include an inferred grammar that is inferred from the current content of XML Document 806. Grammar 812 is updated during an editing session based on the entire current content of Document 806 after one or more editing input from the user has been received by Editor 802 through input device 108.

As can be appreciated, since grammar is inferred from the entire current content, the inferencing algorithm is easy to implement. The grammar can be generated or re-generated using the same algorithm after Document 806 is initially loaded or after Document 806 is modified. There is no need for a routine to determine the particular section(s) of Document 806 that has been changed. Programming effort can be reduced and some modules of existing XML editors can be reused. This approach may be desirable when parsing the entire document and re-building the grammar model to ensure the parsing does not consume too much computing resources and does not significantly affect the performance of Editor 802. As the inferred grammar is often not a standard or real grammar, the grammar is inferred loosely. For example, instead of specifying the precise order of the child elements, an inferred rule of grammar or element declaration may simply specify all the child elements without any order requirement.

Editor 802 displays the current content of Document 806 on Display 120, referred to as the Displayed Document 816. A user can instruct Editor 802 to open a new XML document for editing or to make a certain change in the loaded XML Document 806, the latter referred herein as an edit event. For example, an edit event may include a key stroke or a mouse click. As can be appreciated, when an edit event occurs, a change is made to the Displayed Document 816 as well as the loaded Document 806.

Assistance 818 is provided at user request on Display 120. Any grammatical assistance provided is based on the updated Grammar 812 associated with the context at which the edit cursor is positioned.

In operation, on initial loading or opening of Document 806, Grammar 812 is generated and loaded into memory. It is then updated as follows. Editor 802 continuously monitors the occurrence of edit events. On detecting an edit event, a timer starts running. If no additional edit event is detected before a predefined time interval, e.g. two seconds, has elapsed, Grammar 812 is updated. If a further edit event is detected before the predefined time interval has elapsed, the timer is reset and no update would be performed at this time. As can be appreciated, this approach is efficient and can be advantageous when computing resources and computing speed are limiting factors of the application performance. For example, noticeable system delay can be avoided and the user does not have to wait for processor time and can continuously enter input if no assistance is required.

When Grammar 812 is updated, all entries in the data structure storing Grammar 812 may be removed. Thus, each update of Grammar 812 actually reconstructs the grammar. However, it is not necessary to remove all previous entries and entries can be removed only if necessitated by the changes in Document 806. Nonetheless, the code for removing all previous entries and regenerating Grammar 812 can be easier to program than partial removal. When tested in an exemplary embodiment of the invention, it was found that this approach does not impose any significant resource burden on the system.

After all grammar elements in Document 806 are processed, Grammar 812 has been generated or updated. If the user invokes an assistance function before making a further change to Document 806, for example, by entering a particular key-combination or right-click a mouse, a corresponding Assistance 818 is provided based on the updated Grammar 812. If the user makes further changes to Document 806, the process described above is repeated and Grammar 812 may be updated again.

As is now clear, and advantageously, since a grammar associated with any grammar element of the edited document, either inferred or real, is readily available, proper assistance can be provided consistently at all times, even when a real grammar is not available or when new grammar elements have been introduced. Since the grammar is updated after changes have been made to the content of the document, the assistance provided is up-to-date, complete, and accurate. Further, grammar inferencing can be performed automatically in the background and is therefore transparent to the user. When grammar inferencing is performed quickly, it will not negatively affect the performance of the editor from the user's perspective. Thus, an editor incorporating aspects of the present invention can have good performance and be convenient to use.

While some embodiments of the invention are described herein with reference to markup documents that contain text only, it can be appreciated and should be understood that different embodiments of the invention can be used to assist the editing of a markup document that contains non-textual contents such as graphic objects.

As can be understood, the above examples are for illustration purposes only and can be modified as appropriate for a particular application of an embodiment of the invention. Further, additional functionality may also be implemented in Editor 200 or 802. Such modifications can be readily implemented according to known programming and computing techniques.

Other features, benefits and advantages of the present invention not expressly mentioned above can be understood from this description and the accompanying drawings by those skilled in the art.

The invention, rather, is intended to encompass all such modification within its scope, as defined by the claims.

What is claimed is:

1. An apparatus, comprising:
a processor; and
a memory coupled to the processor, wherein the memory comprises instructions which, when executed by the processor, cause the processor to:
present a markup language document on a display coupled to the apparatus, for editing by a user, wherein the markup language document is a document comprising current content generated using at least one markup language; and
provide grammatical assistance to the user based on a markup language grammar inferred from the current content of the markup language document, wherein the markup language grammar comprises syntax rules of the at least one markup language used to generate the current content of the markup language document.

2. The apparatus of claim 1, wherein the markup language grammar comprises at least one of definition rules for creating new types of markup language document elements and attributes, and declaration rules for enabling elements and attributes with specific names and types to appear in the markup language document.

3. The apparatus of claim 1, wherein the instructions cause the processor to infer the markup language grammar automatically from the current content and load the markup language grammar into the memory of the apparatus.

4. The apparatus of claim 3, wherein the instructions cause the processor to dynamically update the markup language grammar based on real-time edits to the markup language document.

5. The apparatus of claim 4, wherein the instructions cause the processor to update the markup language grammar only after a pre-defined time interval has elapsed since the markup language document was last edited.

6. The apparatus of claim 3, wherein the inferred markup language grammar is associated with a markup language grammar element appearing in the markup language document for which an associated real markup language grammar defined in a markup language grammar file is not available.

7. The apparatus of claim 1, wherein the instructions cause the processor to provide assistance to the user by:
providing assistance to the user for editing the markup language document based on a real markup language grammar defined in a markup language grammar file for portions of the markup language document having elements corresponding to information in the markup language grammar file, and
providing assistance to the user for editing the markup language document based on the inferred markup language grammar for portions of the markup language document having elements that do not correspond to information in the markup language grammar file.

8. The apparatus of claim 7, wherein the real markup language grammar file is an XML schema definition (XSD) file or a data type definition (DTD) file.

9. The apparatus of claim 7, wherein the instructions cause the processor to provide grammatical assistance to the user based on a markup language grammar inferred from current content of the markup language document by:
constructing a document object model associated with the current content of the markup language document, the document object model comprising a set of markup language grammar elements each associated with one or more portions of the current content of the markup language document;
for each markup language grammar element of the set, determining whether the each markup language grammar element is associated with an available real markup language grammar and, if not, inferring one or more markup language grammar rules associated with the each markup language grammar element; and incorporating the inferred one or more markup language grammar rules into the inferred markup language grammar.

10. The apparatus of claim 1, wherein the markup language document is an extensible markup language (XML) document.

11. The apparatus of claim 10, wherein when the XML document is associated with a plurality of markup language grammars, each one of the plurality of markup language grammars is associated with a namespace and, for a particular markup language grammar element associated with a particular namespace, assistance related to the particular markup language grammar element is provided to the user based on the markup language grammar associated with the particular namespace.

12. A system for providing assistance to a user who is editing an extensible markup language (XML) document, comprising:
a computing device running an editor for editing an XML document; and
a display device coupled to the computing device that displays the editor and the XML document, wherein the editor running on the computing device causes the computing device to:
present to the user the XML document for editing via the display device;
monitor a user input for an edit event;
in response to detecting an edit event, inferring a markup language grammar from current content of the XML document; and
provide assistance to the user based on the inferred markup language grammar, wherein the markup language grammar comprises XML syntax rules inferred from the current content of the XML document.

13. The system of claim 12, wherein the markup language grammar comprises at least one of definition rules for creating new types of markup language document elements and attributes, and declaration rules for enabling elements and attributes with specific names and types to appear in the markup language document.

14. The system of claim 12, wherein the editor causes the computing device to infer the markup language grammar automatically from the current content and load the markup language grammar into the memory of the apparatus.

15. The system of claim 14, wherein the editor causes the computing device to dynamically update the markup language grammar based on real-time edits to the markup language document.

16. The system of claim 15, wherein the editor causes the computing device to update the markup language grammar only after a pre-defined time interval has elapsed since the markup language document was last edited.

17. The system of claim 14, wherein the inferred markup language grammar is associated with a markup language grammar element appearing in the markup language document for which an associated real markup language grammar defined in a markup language grammar file is not available.

18. The system of claim 12, wherein the editor causes the computing device to provide assistance to the user by:
providing assistance to the user for editing the markup language document based on a real markup language grammar defined in a markup language grammar file for portions of the markup language document having elements corresponding to information in the markup language grammar file, and
providing assistance to the user for editing the markup language document based on the inferred markup language grammar for portions of the markup language document having elements that do not correspond to information in the markup language grammar file.

19. The system of claim 12, wherein the markup language document is an extensible markup language (XML) document, and wherein when the XML document is associated with a plurality of markup language grammars, each one of the plurality of markup language grammars is associated with a namespace and, for a particular markup language grammar element associated with a particular namespace, assistance related to the particular markup language grammar element is provided to the user based on the markup language grammar associated with the particular namespace.

20. The system of claim 18, wherein the editor causes the computing device to provide grammatical assistance to the user based on a markup language grammar inferred from current content of the markup language document by:
constructing a document object model associated with the current content of the markup language document, the document object model comprising a set of markup language grammar elements each associated with one or more portions of the current content of the markup language document;
for each markup language grammar element of the set, determining whether the each markup language grammar element is associated with an available real markup language grammar and, if not, inferring one or more markup language grammar rules associated with the each markup language grammar element; and
incorporating the inferred one or more markup language grammar rules into the inferred markup language grammar.

* * * * *